United States Patent Office 2,781,337
Patented Feb. 12, 1957

2,781,337

DIAZOAMINO COMPOUNDS

Eduard Moser, Basel, Albert Bolleter, Muttenz, and Christian Wittwer, Basel, Switzerland, assignors to Ciba Limited, Basel, Switzerland, a Swiss firm No Drawing. Application August 20, 1954,
Serial No. 451,295

Claims priority, application Switzerland August 28, 1953

9 Claims. (Cl. 260—140)

This invention provides valuable new diazoamino-compounds which, like the compound of the constitution (1) 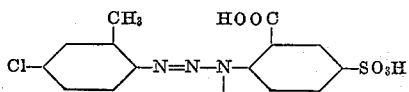

correspond to the general formula (2) 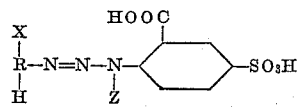

in which R represents a benzene radical, X and H are each in ortho-position relatively to the —N=N— group, X represents a methyl, methoxy or ethoxy group (U) or a hydrogen or chlorine atom, and Z represents a methyl or benzyl group (V) or a straight chain alkyl radical (W) containing 2 to 4 carbon atoms and bound to the nitrogen atom by an end carbon atom, and in which formula the radical

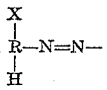

is the radical of an amine of the constitution

which is free from groups imparting solubility in water and of which the $pK_A$-value differs by at most $\pm 0.7$ from the value $c_{(X;Z)}$, where the latter value is one of the following $c_{(X=H;\, Z=V)} = 4.8$, $c_{(X=H;\, Z=W)} = 4.2$, $c_{(X=U;\, Z=V)} = 4.0$ $c_{(X=U;\, Z=W)} = 3.5$, $c_{(X=Cl;\, Z=V)} = 3.6$, $c_{(X=Cl;\, Z=W)} = 2.9$ The invention also provides a process for making the above new diazoamino-compounds wherein a 1-aminobenzene-2-carboxylic acid-4-sulfonic acid of the formula (3) 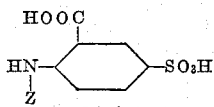

in which Z has the meaning given above, is condensed with a diazo-compound of an amine free from groups imparting solubility in water and having the formula (4) 

in which R and X have the meanings given above, and X and H are each in ortho-position relatively to the —NH₂ group, and wherein the starting materials are so chosen that the $pK_A$-value of the latter amine and the value $c_{(X;Z)}$ fulfil the above requirements.

The 1-aminobenzene-2-carboxylic acid-4-sulfonic acids of the Formula 3 contain a secondary amino group, of which the nitrogen atom is bound either to a methyl or benzyl group (Z=V) or to an end carbon atom of a straight chain, that is to say, unbranched, alkyl group having 2-4 carbon atoms (Z=W). In the latter case Z is therefore an ethyl, n-propyl or n-butyl group. As examples of such compounds there may be mentioned:

(Z=V): 1 - methylaminobenzene - 2 - carboxylic acid - 4-sulfonic acid,
1- benzylaminobenzene - 2 - carboxylic acid - 4-sulfonic acid, (Z=W): 1-ethylaminobenzene - 2 - carboxylic acid - 4-sulfonic acid,
1 - n - butylaminobenzene - 2 - carboxylic acid - 4-sulfonic acid.

The amines of the Formula 4, of which diazo-compounds are used as starting materials in the present process, are amines of the benzene series. They contain no substituents in one of the ortho-positions relatively to the diazotizable amino group and in the other of these ortho-positions they may be unsubstituted or contain a chlorine atom or a methyl, methoxy or ethoxy group. The benzene nucleus may contain further substituents which do not impart solubility in water and are present in positions other than an ortho-position relatively to the amino group, for example, halogen atoms such as chlorine, or methyl, ethyl, methoxy or ethoxy groups, trifluoromethyl groups or nitro groups. Thus, the amines may be unsubstituted in para-position relatively to the amino group or may contain in that position a chlorine atom, a methyl, methoxy or acylamino group. There come into consideration, for example, the following amines:

1-amino-3-chlorobenzene,
1-amino-2-methyl-4-chlorobenzene,
1-amino-2-methyl-5-chlorobenzene,
1-amino-4-methylbenzene,
1-amino-4-methoxybenzene,
1-amino-2-methoxy-5-chlorobenzene,
1-amino-2-methoxy-4-chloro-5-methylbenzene,
1-amino-2-methoxy-4-benzoylamino-5-methylbenzene,
1-amino-2:5-dimethoxy-4-benzoylaminobenzene,
1-amino-2:5-diethoxy-4-benzoylaminobenzene,
1-amino-2-chloro-4-methoxybenzene.

The 1-aminobenzene-2-carboxylic acid-4-sulfonic acids of the Formula 3 and the diazo compounds of the amines of the Formula 4 cannot be chosen at random for combination with one another, but the amine must be so chosen that its $pK_A$-value is not more than 0.7 higher or lower than the value $c_{(X;Z)}$. The value $c_{(X;Z)}$ depends on the nature of the substituent in ortho-position relatively to the amino group of the amine (X=H,Cl,CH₃,OCH₃ or OC₂H₅) and on the nature of the substituent in the amino group of the aminobenzene carboxylic acid sulfonic acid (Z=V or W).

In order to determine whether a particular combination of starting materials falls within the invention, the $pK_A$-value of the selected amine must be known, and then it can easily be determined whether this value differs by at most $\pm 0.7$ from the value $c_{(X;Z)}$ given above for the particular substituents X and Z of the chosen combination. Thus, for example, the $pK_A$-value of 1-amino-4-methoxybenzene is 5.3, in which case X is a hydrogen atom. If this amine is combined with 1-methylamino- or 1-benzylamino-benzene-2-carboxylic acid-4-sulfonic acid (Z=V), the value $c_{(X;Z)} = c_{(X=H;Z=V)} = 4.8$. The latter value differs from 5.3 by less than 0.7, so that this combination falls within the invention. If, on the other hand, the same amine is combined with 1-ethylaminobenzene-2-carboxylic acid-4-sulfonic acid (Z=W) the value $$c_{(x;z)} = c_{(x=H;z=W)} = 4.2$$

which differs from 5.3 by more than 0.7, so that this combination or the compound obtainable thereby does not fall within the invention.

According to recent textbooks the $pK_A$-value of the amine $R-NH_2$ is derived from the equilibrium $$RNH_3^\oplus \rightleftharpoons R-NH_2 + H^\oplus$$

of which the acidity constant is $$K_A = \frac{(R-NH_2) \cdot (H^\oplus)}{(R-NH_3^\oplus)}$$

the symbols for the components of the equilibrium enclosed within curved brackets representing the activities of these components.

The $pK_A$-value is defined by the relationship $$pK_A = -\log K_A.$$

Fuller information with regard to the $pK_A$-value and its determination, which may be carried out by an acidimetric, conductometric or colorimetric method, may be obtained, for example, from "Physical Chemistry of Electrolytic Solutions" by H. S. Harned and B. B. Owen, Chapter 15/4, 1943 edition, pages 480 et seq.

In order to facilitate determination of the permissible deviations of the $pK_A$-values from the basic values for $c_{(x;z)}$ the following table may be used. From this table direct readings can be obtained of the limits within which the $pK_A$-value of a particular base may vary for given substituents X in ortho-position to the amino group of the amine and for given nitrogen-substituents Z in the 1-aminobenzene-2-carboxylic acid-4-sulfonic acid.

PERMISSIBLE $pK_A$-RANGE OF THE AMINE

| Z | X=H | X=U=$-OCH_3$<br>$-CH_3$<br>$-OC_2H_5$ | X=Cl |
|---|---|---|---|
| Z=V | 4.1 to 5.5 | 3.3 to 4.7 | 2.9 to 4.3 |
| Z=W | 3.5 to 4.9 | 2.8 to 4.2 | 2.2 to 3.6 |

The preparation of the diazo-compounds of the amines of the Formula 4 and the reaction of these amines with the 1-aminobenzene-2-carboxylic acid-4-sulfonic acids of the Formula 3 may be carried out by methods in themselves known. The condensation to form the diazoamino-compounds is advantageously carried out in an alkaline medium. It has been found that the diazoamino-compounds so obtained cannot be isolated satisfactorily from the reaction mixture by the usual methods. It is surprising, however, that these reaction mixtures can be worked up very successfully, if desired after filtering them to remove undissolved impurities, by subjecting the resulting solutions of the diazoamino-compounds to a rapid drying process. As a rapid drying process there is to be understood one in which the material to be dried is subjected to a high temperature in the aqueous condition only for a short time, advantageously a period of the order of a few seconds, but it is permissible once the material is dried, to maintain it at a high temperature for a long period. Accordingly, there are suitable drying or evaporation methods in which the solution to be evaporated to dryness is continuously exposed in a finely divided state to a powerful source of heat, and advantageously care is taken that the water vapour evolved is continuously and efficiently removed.

Especially advantageous for this purpose is spray drying. The term "spray drying" is used in its ordinary sense to mean a treatment in which the aqueous solution or suspension to be dried is finely sprayed or atomized and simultaneously exposed to a current of warm air. The heat of the current of air is used to evaporate the solvent, especially water. In this manner the air-solvent vapour-dry material system undergoes cooling. For drying aqueous solutions or suspensions to produce a dry preparation it is generally necessary to maintain the outlet temperature of the said system at at least about 70° C., advantageously between 80 and 100° C., and for the same reason it is necessary that the inlet temperature of the air should be above 100° C., advantageously within the range of 130–180° C. in order to avoid having to heat uneconomically large amounts of air.

Instead of spray drying, there may be used another rapid drying process, for example, a drying process in which the cold solution or suspension is applied in a thin layer to a hot roller or moving band. In this case also it is preferable, on the one hand, by heating to a sufficiently high temperature the moving surface, for example, the roller, and, on the other, by finely distributing the material to be dried, for example, by breaking it up into droplets or by spraying it, to ensure that a thin uniform film of the material to be dried is formed from which the solvent can be completely distilled in a short time. After a short time the dry layer is completely removed from the hot surface by means of a knife or other suitable apparatus, the material being removed in any event before fresh solution is applied to the place it occupies.

It is surprising that during such rapid drying processes there is at most only a very slight decomposition of the diazo-compound or diazoamino-compound, and even in cases where, owing to an unfavorable equilibrium between the starting materials and the diazoamino-compound being established when the condensation was carried out, a not inconsiderable amount of the temperature-sensitive diazo compound is still present.

The new diazoamino-compounds of the Formula 2 can be worked up in the usual manner together with suitable coupling components (so-called naphthols), for example, acetoacetylamino-compounds, 2-hydroxynaphthalene-3-carboxylic acid arylides, hydroxydiphenylene oxide carboxylic acid arylides, hydroxycarbazole carboxylic acid arylides or hydroxyanthracene carboxylic acid arylides, to form valuable preparations and printing pastes, which do not require acid steaming for developing the prints and therefore need no addition serving to produce an acid reaction. It will be understood, however, that development may be carried out by acid steaming, in which case only a very short period of acid steaming is usually necessary for complete development.

The following examples illustrate the invention, the parts and percentages being by weight unless otherwise stated, and the relationship of parts by weight to parts by volume being the same as that of the kilogram to the liter:

*Example 1*

17.8 parts of the hydrochloride of 1-amino-2-methyl-4-chlorobenzene ($pK_A$=3.8) are diazotized in the usual manner at 0–7° C. in 45 parts of hydrochloric acid of 10 percent strength with 6.9 parts of sodium nitrate dissolved in 25 parts of water. The volume of the diazo solution should be 150°200 parts by volume. At the same time there is prepared a solution of 23.1 parts of 1-methylaminobenzene-2-carboxylic acid-4-sulfonic acid in 200 parts of water with the addition of a sufficient quantity of a sodium hydroxide solution of 30 percent strength to maintain the clear solution at a pH value of 7–8. There are then added 2 parts of anhydrous sodium carbonate and 2 parts of sodium bicarbonate, and the whole is cooled to −4° C. in an ice-sodium chloride bath, and, if necessary, by the addition of ice. The diazo solution is run in below the surface while stirring vigorously, and at the same time a sufficient quantity of a sodium hydroxide solution of 30 percent strength is introduced dropwise to maintain the mixture at a pH value of 9.5 to 10 and to give a final pH value of 10. After the addition of diatomaceous earth, the mixture is filtered to remove a small amount of flocculent material, and the solution is then sprayed in a spray dryer, in which the inlet temperature of the air is between 130 and 180° C., the outlet temperature is not less than 70° C. and does not substantially exceed 100° C. There is obtained a pale brown very fine powder which dissolves easily in water and has a content of about 50 percent of the diazoamino-compound.

*Example 2*

10.7 parts of 1-amino-4-methylbenzene ($pK_A=5.0$) are diazotized in the usual manner in 75 parts of hydrochloric acid of 10 percent strength with 6.9 parts of sodium nitrite dissolved in 25 parts of water. At the same time there is prepared a solution of 23.1 parts of 1-methylaminobenzene-2-carboxylic acid-4-sulfonic acid in the manner described in Example 1. The diazo solution is run in beneath the surface at 0° to −4° C., and at the same time a sufficient quantity of a sodium hydroxide solution of 30 percent strength is added to maintain the mixture at a pH value of 9.5 to 10. Finally the pH value is adjusted to 10 with a solution of sodium hydroxide, and the mixture is filtered with the aid of diatomaceous earth to remove a small amount of impurities. The clear solution is worked up in a spray dryer as described in Example 1. There is obtained a pale powder having a content of about 45 percent of the diazoamino-compound and in a yield of approximately 80 percent of the theoretical yield.

By using, instead of 10.7 parts of 1-amino-4-methylbenzene, 12.3 parts of 1-amino-4-methoxybenzene ($pK_A=5.3$) and otherwise proceeding in the same manner, the corresponding diazoamino-compound is obtained in the form of a pale brown powder having a content of about 45 percent and in the same yield.

*Example 3*

17.1 parts of 1-amino-2-methoxy-4-chloro-5-methylbenzene ($pK_A=4.1$) are diazotized as described in Example 1 and filtered. The volume of the diazo-solution should be 150–200 parts by volume. At the same time there is prepared a solution of 23.1 parts of 1-methylaminobenzene-2-carboxylic acid-4-sulfonic acid in 200 parts of water with a sufficient quantity of a sodium hydroxide solution of 30 percent strength to give the clear solution a pH value of 7–8. There are then added 2 parts of anhydrous sodium carbonate and 2 parts of sodium bicarbonate, and the mixture is cooled to −3° C. The diazo-solution is then run in beneath the surface and at the same time a sufficient quantity of a sodium hydroxide solution of 30 percent strength is added to maintain the pH value between 9.5 and 10. When the mixing operation is finished, the pH value is adjusted to 10 with a sodium hydroxide solution of 30 percent strength, a small amount of diatomaceous earth is added, and the mixture is filtered to remove a small amount of impurities. The diazomino-compound is isolated in a spray dryer as described in Example 1. There is obtained a pale beige powder having a content of diazoamino-compound of about 50 percent and in a yield amounting to about 85 percent of the theoretical yield.

*Example 4*

25.6 parts of 1-amino-2-methoxy-4-benzoylamino-5-methylbenzene are stirred overnight at room temperature in 100 parts by volume of water with 30 parts of hydrochloric acid of 30 percent strength and 2 parts of a solution of 30 percent strength of the hydrochloride of oleyl-diethyl-ethylenediamine, the mixture is then cooled to 0–5° C. and diazotized with 6.9 parts of sodium nitrite in 25 parts of water. The filtered diazo-solution is coupled in the manner described in Example 1 with a solution, also prepared as described in that example, of 23.1 parts of 1-methylamino-benzene-2-carboxylic acid-4-sulfonic acid, the pH value of the reaction mixture being maintained between 8 and 9, and finally adjusted to 9. After filtering the mixture in the presence of diatomaceous earth, the product is worked up in a spray dryer. The diazoamino-compound is obtained in the form of a pale brown powder which dissolves easily in water and has a content of 50 percent. The yield amount to about 75 percent of the theoretical yield.

Instead of 1-amino-2-methoxy-4-benzoylamino-5-methylbenzene, there may be used 27.2 parts of 1-amino-4-benzoylamino-2:5-dimethoxybenzene or 30.0 parts of 1-amino-4-benzoylamino-2:5-diethoxybenzene. The pH value of the reaction mixture is then maintained between 9 and 11 by the addition of a somewhat larger quantity of a sodium hydroxide solution of 30 percent strength, and the pH value is finally adjusted to 11. By evaporating the solution in a spray dryer the corresponding diazoamino-compound is obtained in the form of a pale brown easily soluble powder having a content of 50–60 percent and in a yield of 75–80 percent of the theoretical yield.

$pK_A$-values of the bases

1 - amino - 2 - methoxy - 4 - benzoylamino - 5 - methylbenzene _____ 4.5
1 - amino - 4 - benzoylamino - 2:5 - dimethoxybenzene _____ 4.0
1 - amino - 4 - benzoylamino - 2:5 - diethoxybenzene _____ 3.9

*Example 5*

12.75 parts of 1-amino-3-chlorobenzene ($pK_A=3.6$) are diazotized in the usual manner, the volume of the mixture amounting to 150–200 parts by volume. At the same time there is prepared a solution of 24.5 parts of 1-ethylaminobenzene-2-carboxylic acid-4-sulfonic acid in 200 parts of water with a sufficient quantity of a sodium hydroxide solution of 30 percent strength to give a clear solution having a pH value of 7–8. 2 parts of anhydrous sodium carbonate and 2 parts of sodium bicarbonate are added, and the mixture is then cooled to −3° C. The whole is then mixed with the diazo solution as described in Example 1, and the solution is worked up in a spray dryer. There is obtained a pale powder which dissolves easily in water and has a content of about 50 percent of the diazoamino-compound. The yield amounts to 80–85 percent of the theoretical yield.

By using, instead of 1-ethylaminobenzene-2-carboxylic acid-4-sulfonic acid, 27.3 parts of 1-n-butylaminobenzene-2-carboxylic acid-4-sulfonic acid and proceeding otherwise in exactly the same manner, there is obtained in the same yield a powder having similar properties.

*Example 6*

19.4 parts of the hydrochloride of 1-amino-2-methoxy-5-chlorobenzene ($pK_A=3.5$) are diazotized as described in Example 1. The volume of the filtered diazo-solution should be 150–200 parts by volume. At the same time there is prepared a solution of 24.5 parts of 1-ethylamino-benzene-2-carboxylic acid-4-sulfonic acid in 300 parts of water with a sufficient quantity of a sodium hydroxide solution of 30 percent strength to give a clear solution having a pH value between 7 and 8. 2 parts of anhydrous sodium carbonate and 2 parts of sodium hydrogen carbonate are added, and the mixture is cooled to −3° C. The diazo-solution is run in beneath the surface, while stirring well, and at the same time there is added a sufficient quantity of a sodium hydroxide solution of 30 percent strength to maintain the pH value of the reaction mixture between 10 and 11. The whole is stirred for a further ½ hour at 0–5° C., and is then filtered with the addition of diatomaceous earth to remove a small amount of a flocculent precipitate. The clear brown solution is evaporated in a spray dryer as described in Example 1. The diazoamino-compound is obtained in the form of its sodium salt as a brown powder easily soluble in water.

By using, instead of 1-ethylaminobenzene-2-carboxylic acid-4-sulfonic acid, 30.7 parts of 1-benzylaminobenzene-2-carboxylic acid-4-sulfonic acid and otherwise proceeding in exactly the same manner, the corresponding diazoamino-compound is obtained in a yield of 80–85 percent in the form of a pale beige powder of good solubility and having a content of 55 percent.

*Example 7*

In the manner described in Example 6 there is prepared the diazoamino-compound from diazotized 1-amino - 2 - methyl - 5 - chlorobenzene ($pK_A = 3.4$) and 1-ethylaminobenzene-2-carboxylic acid-4-sulfonic acid.

By using, instead of 1-ethylaminobenzene-2-carboxylic acid-4-sulfonic acid, 27.3 parts of 1-n-butylaminobenzene-2-carboxylic acid-4-sulfonic acid and otherwise proceeding in exactly the same manner, the new diazoamino-compound is obtained in the form of a pale brown powder having a content of 55–60 percent and an excellent solubility. The yield amounts to about 85 percent of the theoretical yield.

*Example 8*

19.4 parts of the hydrochloride of 1-amino-2-chloro-4-methoxybenzene ($pK_A = 3.5$) are diazotized in the usual manner in 45 parts of hydrochloric acid of 10 percent strength with 6.9 parts of sodium nitrite dissolved in 25 parts of water at 3–7° C. At the same time there is prepared as described in Example 5 a solution of 24.5 parts of 1-ethylaminobenzene-2-carboxylic acid-4-sulfonic acid and the solution is coupled with the diazo-solution at −3° C., the pH value being maintained at 9.5–10 by the addition of a sodium hydroxide solution of 30 percent strength and at the end of the coupling the pH value is adjusted to 11. The product is worked up, as described in the preceding examples, in a spray dryer, after the solution has been filtered with the aid of a small amount of diatomaceous earth. The diazoamino-compound is a very slightly yellow colored powder having a content of about 50 percent. The yield amounts to 75–80 percent of the theoretical yield.

*Example 9*

In the manner described in Example 1 there is prepared a solution of the diazoamino-compound from 17.8 parts of the hydrochloride of 1-amino-2-methyl-4-chlorobenzene and 23.1 parts of 1-methylaminobenzene-2-carboxylic acid-4-sulfonic acid. After being filtered the solution is charged into an externally cooled pressure vessel and maintained therein at a temperature of −2 to 0° C. In order to isolate the diazoamino-compound the following apparatus is used:

An externally chromium plated and polished hollow steel roller is horizontally mounted for free rotation. It has a connection for superheated steam at a maximum of 6 atmospheres gauge pressure. A brass knife is pressed against the roller by means of weights at approximately the level of its axis. At a distance of 20–25 centimeters from the roller surface there is arranged perpendicularly with respect to the centre of the axis a nozzle connected to the pressure vessel, the nozzle being so adjusted that the supply of the solution under 2–5 atmospheres gauge pressure suffices, without the special air supply, to atomise the solution finely and spray it on the roller. With a roller 20 centimeters in radius and 20–25 centimeters long and at a speed of rotation of about 6 revolutions per minute, the nozzle and knife are so adjusted that the two planes which they form with the roller axis are at an angle of 120°. The residence time on the roller of the material to be dried is then 3–4 seconds, the roller rotating from the nozzle to the knife in the direction of the shorter distance between them. The quantity of the solution sprayed is 3–4 liters per hour, and the surface temperature of the roller is 115–140° C. (corresponding to 2–5 atmospheres gauge pressure of steam).

The finished diazoamino-compound is removed from the roller in the form of a pale brown powder, and must be ground for a short time in order to attain a uniform fine grain size. The product so obtained does not differ in its content, yield or properties from the product obtained by spray drying in Example 1.

The solutions obtained as described in Examples 2–8 can be worked up in the same manner. There are then obtained diazoamino-compounds which do not differ substantially from the products obtained by spray drying.

*Example 10*

The diazoamino-compounds described in Examples 1–9 can be worked up into printing preparations in accordance with the following table:

For 100 parts of printing preparation

| | Parts | Diazoamino-compound from— | | Content, percent | According to Example | Parts | Coupling component | Sodium di-iso propyl naph- thalene sulfonate | Tint |
|---|---|---|---|---|---|---|---|---|---|
| | | Diazo-component | Stabilizer | | | | | | |
| A | 71.2 | 1-amino-2-methyl-4-chlorobenzene. | 1-methyl-amino-2-carboxybenzene-4-sulfonic acid. | 50 | 1 | 27.8 | 2:3 - hydroxynaphthoic acid -2'-methylanilide Na-salt. | 1.0 | Bluish red. |
| B | 69.1 | 1-amino-4-methyl-benzene. | _____do_____ | 45 | 2 | 29.9 | 3-hydro - oxycarbazole-2-carboxylic acid - 4'-chloranilide. | 1.0 | Red brown. |
| C | 74.5 | 1-amino-2-methoxy-4-chloro - 5 - methyl-benzene. | _____do_____ | 50 | 3 | 24.5 | 1-acetoacetylamino-2:5-dimethoxy - 4 - chloro-benzene. | 1.0 | Yellow. |
| D | 76.8 | 1-amino-4-benzoyl-amino-2:5-diethoxy-benzene. | _____do_____ | 55 | 4 | 22.2 | 2:3 - hydroxynaphthoic acid anilide Na-salt. | 1.0 | Blue. |
| E | 72.5 | 1-amino-4-benzoyl-amino-2:5-di-methoxy-benzene. | _____do_____ | 60 | 4 | 26.5 | 2:3 - hydroxynaphthoic acid - 2':6' - dimethyl-anilide Na-salt. | 1.0 | Reddish violet. |
| F | 73.3 | 1-amino-3-chloro-benzene. | 1-ethylamino-2-carboxybenzene-4-sulfonic acid. | 45 | 5 | 25.7 | 2:3 - hydroxynaphthoic acid-2'-methylanilide Na-salt. | 1.0 | Yellow orange. |
| G | 68.1 | 1-amino-2-methyl-5-chlorobenzene. | _____do_____ | 55 | 7 | 30.9 | 2:3 - hydroxynaphthoic acid - 2' - ethoxy - anilide Na-salt. | 1.0 | Scarlet. |
| H | 77.2 | 1-amino-2-methoxy-5-chlorobenzene. | 1-benzylamino-2-carboxybenzene-4-sulfonic acid. | 45 | 6 | 21.8 | 1-acetylamino-2-methoxy-4-acetoacetylamino-5-chlorobenzene. | 1.0 | Yellow. |
| I | 70.8 | 1-amino-2-chloro-4-methoxybenzene. | 1-ethylaminobenzene-2-carboxylic acid-4-sulfonic acid. | 50 | 8 | 28.2 | 2:3 - hydroxynaphthoic acid -2'- ethoxyanilide Na-salt. | 1.0 | Red. |

With these preparations printing pastes may be prepared as follows:

|  | A | B | C | D | E | F | G | H | I |
|---|---|---|---|---|---|---|---|---|---|
| Printing preparation | 80 | 80 | 60 | 70 | 50 | 50 | 80 | 60 | 60 |
| Urea |  |  |  |  |  |  |  | 50 | 30 |
| Glycerine |  |  |  |  |  | 30 | 30 |  |  |
| Alcohol |  | 30 |  | 30 | 30 |  |  |  | 50 |
| Thiodiethylene glycol |  | 30 | 50 | 50 | 50 | 30 | 30 | 50 | 30 |
| Sodium diisopropyl-naphthalene sulfonate, 10% solution | 20 |  |  |  |  |  |  |  |  |
| Water | 260 | 320 | 355 | 310 | 285 | 310 | 280 | 310 | 250 |
| Sodium hydroxide solution of 30 percent strength | 20 | 20 | 15 | 20 | 15 | 10 | 10 | 10 | 10 |
| Starch-tragacanth thickening | 600 | 500 | 500 | 500 | 550 | 550 | 550 | 500 | 550 |
| Sodium chlorate | 10 | 10 | 10 | 10 | 10 | 10 | 10 | 10 | 10 |
| Terpentine oil | 10 | 10 | 10 | 10 | 10 | 10 | 10 | 10 | 10 |
|  | 1,000 | 1,000 | 1,000 | 1,000 | 1,000 | 1,000 | 1,000 | 1,000 | 1,000 |

A cotton fabric is printed with these printing pastes. The printed material is dried at 50–60° C., and then steamed under neutral conditions in a Mather-Platt apparatus for 5–8 minutes at 100° C. The material is rinsed in the cold and treated with an enzyme preparation for 10 minutes at 40–50° C. in order to remove the starch. It is then rinsed in the cold, soaped at the boil for 10 minutes and dried after being again rinsed. There are obtained pure strong prints. The same strong prints are also obtained by steaming under acid conditions for 2–3 minutes at 100° C. instead of under neutral conditions.

What is claimed is:

1. A diazoamino compound of the formula

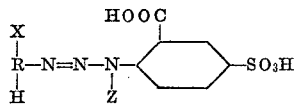

in which R represents a benzene radical, X and H are each in ortho-position relatively to the —N=N— group, X represents a member selected from the group consisting of a hydrogen atom, a chlorine atom, a methyl group, a methoxy group and an ethoxy group, the latter three substituents being denoted by the symbol U, Z represents a member selected from the group consisting of a methyl group, a benzyl group and a straight chain alkyl radical containing 2 to 4 carbon atoms and bound to the nitrogen atom by an end carbon atom, the methyl and benzyl group being denoted by the symbol V and the alkyl radical containing 2 to 4 carbon atoms by the symbol W, and in which formula the radical

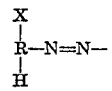

is the radical of an amine of the constitution

which is free from groups imparting solubility in water and of which the pK$_A$-value differs by at most ±0.7 from the value $c_{(x;z)}$, where the latter value is determined in accordance with the substituents present in the diazoamino compound and with the equations $c_{(X=H; Z=V)} = 4.8$, $c_{(X=H; Z=W)} = 4.2$, $c_{(X=U; Z=V)} = 4.2$ $c_{(X=U; Z=W)} = 3.5$, $c_{(X=Cl; Z=V)} = 3.6$, $c_{(X=Cl; Z=W)} = 2.9$ 2. A diazoamino compound of the formula

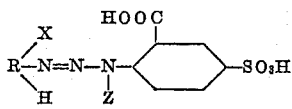

in which R represents a benzene radical carrying in para-position to the —N=N— group a member selected from the group consisting of a hydrogen atom, a chlorine atom, a methyl group, a methoxy group and a benzoylamino group, X and H are each in ortho-position relatively to the —N=N— group, X represents a member selected from the group consisting of a hydrogen atom, a chlorine atom, a methyl group, a methoxy group and an ethoxy group, the latter three substituents being denoted by the symbol U, Z represents a member selected from the group consisting of a methyl group a benzyl group and a straight chain alkyl radical containing 2 to 4 carbon atoms and bound to the nitrogen atom by an end carbon atom, the methyl and benzyl group being denoted by the symbol V and the alkyl radical containing 2 to 4 carbon atoms by the symbol W, and in which formula the radical

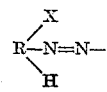

is the radical of an amine of the constitution

which is free from groups imparting solubility in water and of which the pK$_A$-value differs by at most ±0.7 from the value $c_{(x;z)}$, where the latter value is determined in accordance with the substituents present in the diazoamino compound and with the equations $c_{(X=H; Z=V)} = 4.8$, $c_{(X=H; Z=W)} = 4.2$, $c_{(X=U; Z=V)} = 4.0$ $c_{(X=U; Z=W)} = 3.5$, $c_{(X=Cl; Z=V)} = 3.6$, $c_{(X=Cl; Z=W)} = 2.9$ 3. A diazoamino compound of the formula

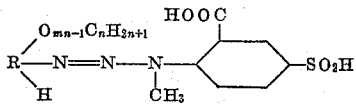

in which R represents a benzene radical, m and n each represents a whole number of at most 2 and the product m·n is at the most 2, —O$_{mn-1}$C$_n$H$_{2n+1}$ and H are each in ortho-position to the —N=N— group and the radical

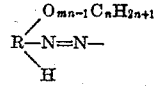

is the radical of an amine of the constitution

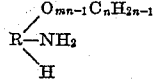

which is free from groups imparting solubility in water and of which the pK$_A$-value differs by at most ±0.7 from 4.0.

4. A diazo amino compound of the formula

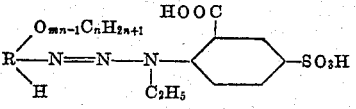

in which R represents a benzene radical, m and n each represents a whole number of at the most 2 and the product $m \cdot n$ is at the most 2, $-O_{mn-1}C_nH_{2n+1}$ and H are each in ortho-position to the —N=N— group and the radical

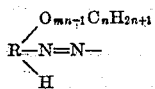

is the radical of an amine of the constitution

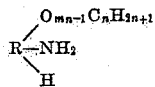

which is free from groups imparting solubility in water and of which the $pK_A$-value differs by at most ±0.7 from 3.5.

5. The diazoamino compound of the formula

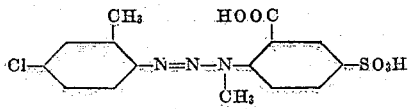

6. The diazoamino compound of the formula

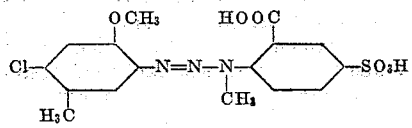

7. The diazoamino compound of the formula

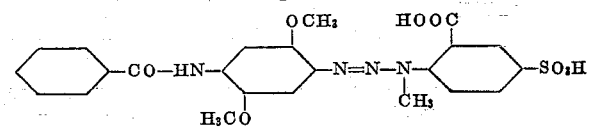

8. The diazoamino compound of the formula

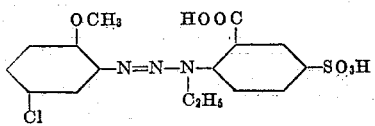

9. The diazoamino compound of the formula

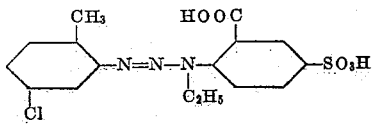

References Cited in the file of this patent

UNITED STATES PATENTS

| | | |
|---|---|---|
| 2,522,838 | Petitcolas et al. | Sept. 19, 1950 |
| 2,675,374 | Petitcolas et al. | Apr. 13, 1954 |

FOREIGN PATENTS

| | | |
|---|---|---|
| 1,049,221 | France | Aug. 12, 1953 |